G. HAYES.
Corn-Planters.
No. 139,672.  Patented June 10, 1873.
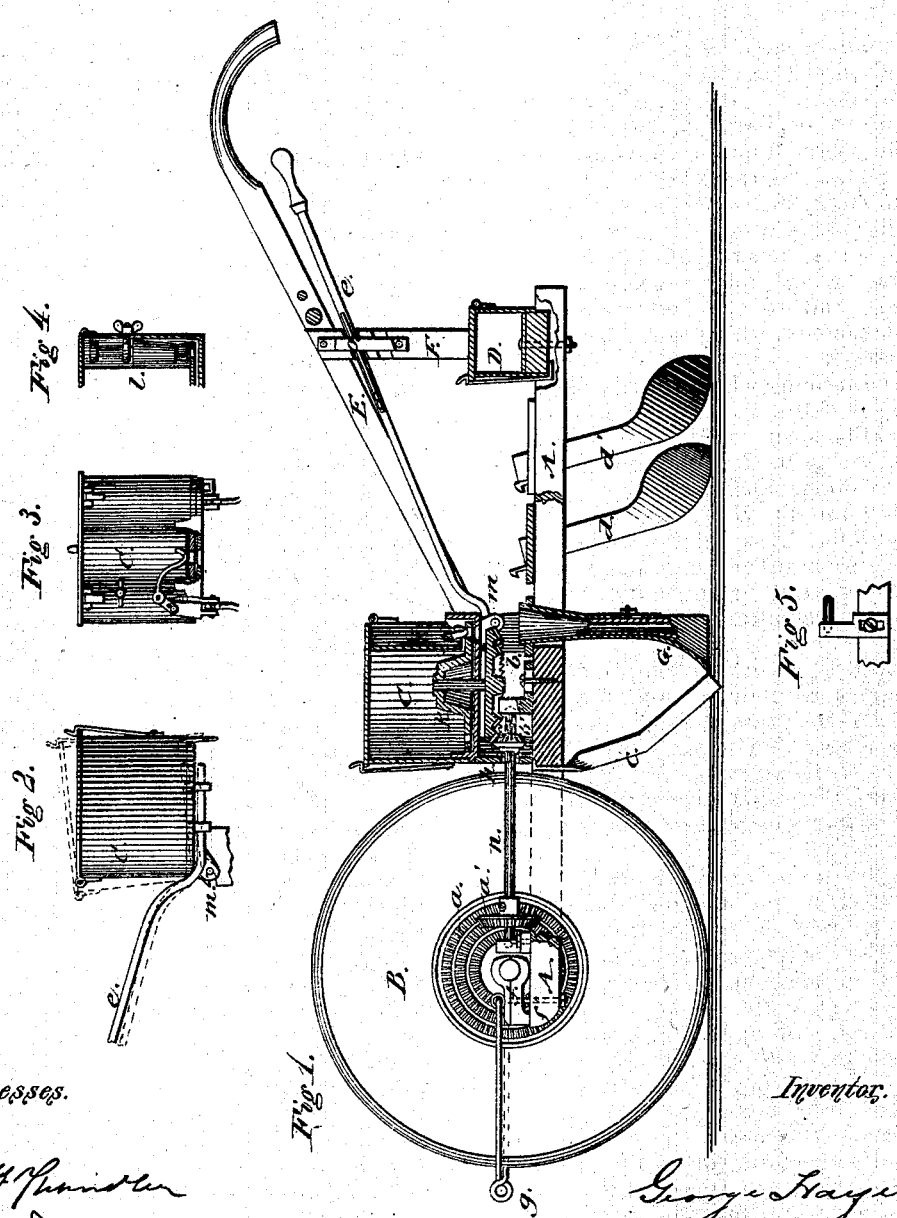

UNITED STATES PATENT OFFICE.

GEORGE HAYES, OF LAWRENCEBURG, INDIANA.

IMPROVEMENT IN CORN-PLANTERS.

Specification forming part of Letters Patent No. 139,672, dated June 10, 1873; application filed December 5, 1872.

*To all whom it may concern:*

Be it known that I, GEORGE HAYES, of Lawrenceburg, in the county of Dearborn and State of Indiana, have invented certain new and useful Improvements in Corn-Planters; and I do hereby declare that the following is a full, clear, and exact description thereof, that will enable others skilled in the art to which it appertains to make and use the same, reference being had to the accompanying drawings and to the letters of reference marked thereon, which form a part of this specification.

This corn-planter is primarily designed for planting in drills, but may be used for planting in hills, as it is capable of being constructed so as to drop the grains at any required distance apart, and belongs to that class of planters which have rotating droppers, operated by a pilot or driving-wheel; and the present invention consists in the novel construction and arrangement of parts, as will be hereinafter fully described and claimed.

Figure 1 is a vertical longitudinal section of my improved planter. Fig. 2 is a perspective view of the grain-box and appurtenances. Fig. 3 is a rear view of the grain or seed box. Fig. 4 is a sectional view, showing the method of securing the cut-off brush. Fig. 5 is a detached view of one of the adjustable journal-boxes.

A is the frame of the planter, constructed of wood, in the manner usual for such machines, upon the rear portion of which is secured the tool-box D, and journaled to the front part of the frame is the driving or pilot wheel B, which we prefer to construct of wrought-iron, and having a series of concentric bevel-gears, $a$, attached upon one side. The axle of the wheel B runs in two peculiarly-constructed boxes, $f$, which are secured to the frame A by means of two eye-bolts, $f^1$. These bolts also form the means of attaching the draw-bar $g$ to the frame of the machine. In the rear of the driving-wheel a metallic curb, $h$, is secured upon the frame, which serves as a support to the seed-box C, also as a shield to protect the operating mechanism of the box from dirt and becoming clogged with trash. The seed-box is composed of a bottom plate, which supports a body cylindrical in form, so as to conform to the shape of the circular rotating drop-plate $k$, which forms the floor thereof, leaving no space between its edges and the sides of the box. This dropping-plate $k$ is furnished with a conical elevation ocupying a large part of its area, which prevents the accumulation of a pile of grain at the center of the plate when the grain is dropped in hills at a great distance apart, as the movement of the plate at such times is so slow as not to throw the grain to its periphery. At regular distances upon a circle near the periphery of the plate $k$ are perforations for receiving such an amount of grain as may be desired to be dropped in one hill. The body of the seed-box C, at the point where the cut-off brush $l$ is placed, trends inward so as to form a cavity in which the brush is secured, and also leaves an open space over the delivering-aperture so that any failure to drop the seed regularly in the operation of the machine will be at once detected. At the rear of and attached to the seed-box are opening hinges, $m$, which allow the box to be easily tilted upon them, so as to elevate the front part, or allow it to be easily removed altogether. This movement is accomplished by means of the tilting-lever $e$, which passes through loops secured to the bottom of the box and thence up along the right-hand handle E of the machine into close proximity with the right hand of the operator. A pressure upon this tilting-lever tilts the box upon the hinges $m$; thus disconnecting the gear which drives the dropping-plate, and stopping the action of the machine. Secured to the standard F is a clamp, $o$, upon which, or the standard, are formed suitable notches into which a projection upon the lever $e$ enters, thus holding the seed-box in its working position, or out of it, at the option of the operator. A shaft, $n$, carries the bevel-pinions $a'$ $b'$, which are made adjustable at any desired point upon the shaft $n$, by means of a feather-key and set-screws, or any other equivalent device, and may thus be moved to mesh with either of the concentric gears $a$ upon the driving-wheel, or the gears $b$ upon the dropping-plate. By this means the speed with which the dropping-plate rotates is changed, allowing of great variety in the distances at which the grain is dropped. The rotation of the dropping-plate $k$ allows the grain which may be in any one of its perforations to drop into the perpendicular spout inclosed by the drill G. It will be seen that the vertical position of the drill insures the dropping of the grain into the furrow and avoids all danger of clogging in the spout, as sometimes happens with similar machines using an inclined spout. The spout in my machine is also fully protected from injury by turf or trash, it being inclosed by the drill, which is itself preceded by a trash-clearer, $c$, secured to the frame A, in the rear of the driving-wheel. The covering-hoes $d$ and $d'$ are shaped somewhat like the mold-board of a plow; one being placed a short distance in the rear of the other, they do not catch and retain trash, as is often the case with the planters in use, sometimes necessitating frequent stops for the purpose of clearing away the refuse matter collected by the drill and covering-hoes.

I am aware that many machines are in use which have the same general appearance as mine, and use a portion of my devices; but these I do not claim.

Having thus described my invention, I claim and desire to secure by Letters Patent—

The combination of the seed-box C, provided with a conical dropping-plate, $k$, with the tilting-lever $e$, standard F, and clamp $o$, substantially as and for the purpose specified.

In testimony that I claim the foregoing I have hereunto set my hand this 27th day of November, 1872.

GEORGE HAYES.

Witnesses:
GEORGE M. ROBERTS,
JOS. McGRANAHAN.